(12) United States Patent
Dietachmayr

(10) Patent No.: US 9,616,651 B2
(45) Date of Patent: Apr. 11, 2017

(54) APPARATUS FOR LAYING FIBER TAPES

(71) Applicant: GFM—GmbH, Steyr (AT)

(72) Inventor: Harald Dietachmayr, Sierning (AT)

(73) Assignee: GFM—GmbH, Steyr (AT)

( * ) Notice: Subject to any disclaimer, the term of this patent is extended or adjusted under 35 U.S.C. 154(b) by 0 days.

(21) Appl. No.: 14/569,978

(22) Filed: Dec. 15, 2014

(65) Prior Publication Data

US 2015/0165753 A1 Jun. 18, 2015

(30) Foreign Application Priority Data

Dec. 16, 2013 (AT) .............................. A 50829/2013

(51) Int. Cl.
*B29C 70/38* (2006.01)
*B32B 38/18* (2006.01)
*B32B 37/10* (2006.01)
*B32B 37/18* (2006.01)

(52) U.S. Cl.
CPC ........ *B32B 38/1808* (2013.01); *B29C 70/388* (2013.01); *B32B 37/10* (2013.01); *B32B 37/18* (2013.01)

(58) Field of Classification Search
CPC .............................. B29C 70/384; B29C 70/388
See application file for complete search history.

(56) References Cited

U.S. PATENT DOCUMENTS

| 4,351,688 | A |   | 9/1982  | Weiss et al. |
| 4,750,965 | A |   | 6/1988  | Pippel et al. |
| 4,842,684 | A | * | 6/1989  | Tillement ................ B29C 41/12 156/247 |
| 4,869,774 | A |   | 9/1989  | Wisbey |
| 4,954,204 | A | * | 9/1990  | Grimshaw ............ B29C 70/388 156/361 |
| 5,011,563 | A |   | 4/1991  | Shinno et al. |
| 5,015,326 | A | * | 5/1991  | Frank ..................... B29C 70/388 156/353 |
| 5,058,497 | A |   | 10/1991 | Bishop et al. |
| 5,314,563 | A |   | 5/1994  | Grimshaw et al. |
| 5,316,612 | A |   | 5/1994  | Peterson et al. |
| 5,352,306 | A | * | 10/1994 | Grimshaw ............ B29C 70/388 156/189 |
| 5,454,897 | A |   | 10/1995 | Vaniglia |
| 5,975,179 | A |   | 11/1999 | Kelly, Jr. |
| 5,989,384 | A |   | 11/1999 | Grimshaw et al. |
| 6,105,648 | A |   | 8/2000  | De Graaf et al. |
| 6,390,169 | B1 |  | 5/2002  | Johnson |
| 8,042,594 | B2 |  | 10/2011 | Miller et al. |
| 9,248,591 | B2 |  | 2/2016  | Caffiau et al. |
| 2007/0044922 | A1 | | 3/2007 | Mischler et al. |

(Continued)

FOREIGN PATENT DOCUMENTS

DE 27 53 272 A1 5/1979
EP 0 371 289 A1 6/1990

*Primary Examiner* — Jeff Aftergut
(74) *Attorney, Agent, or Firm* — Collard & Roe, P.C.

(57) ABSTRACT

An apparatus for laying fiber tapes includes a deflection guide for the fiber tapes consisting of pressure plates which are arranged adjacent to one another transversely to the deflection axis and a frame which is displaceable in the laying direction for accommodating the pressure plates. At least a part of the pressure plates respectively form a sliding shoe which is resilient in the pressing direction for the deflection of the tape.

4 Claims, 3 Drawing Sheets

(56) References Cited

U.S. PATENT DOCUMENTS

2008/0000576 A1* 1/2008 Miller .................. B29C 70/382
                                                    156/166
2013/0092325 A1    4/2013 Genssen

* cited by examiner

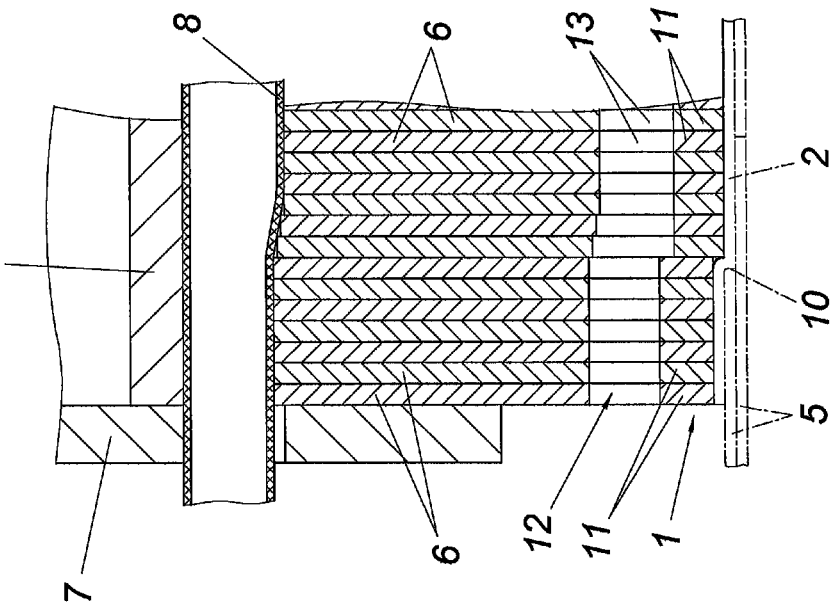
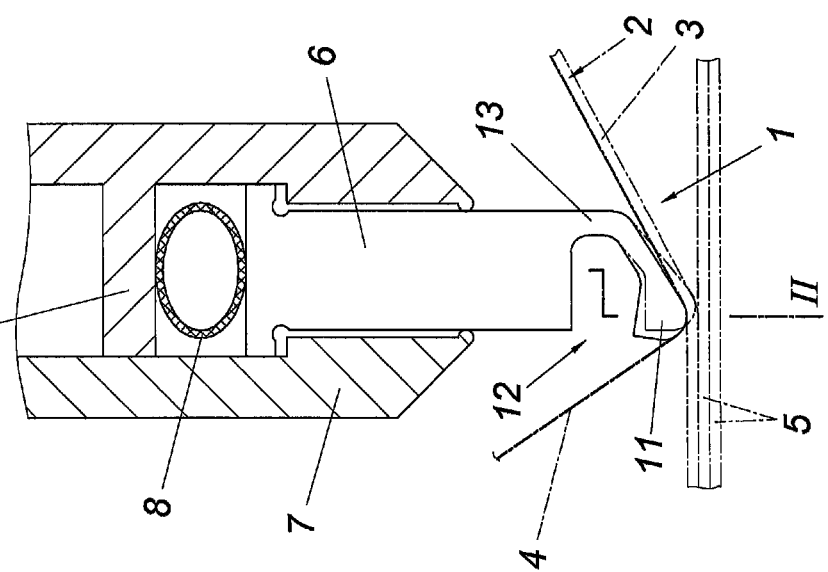

APPARATUS FOR LAYING FIBER TAPES

CROSS REFERENCE TO RELATED APPLICATIONS

Applicant claims priority under 35 U.S.C. §119 of Austrian Application No. A50829/2013 filed Dec. 16, 2013, the disclosure of which is incorporated by reference.

FIELD OF THE INVENTION

The invention relates to an apparatus for laying fiber tapes, comprising a deflection guide for the fiber tapes consisting of pressure plates which are arranged adjacent to one another transversely to the deflection axis, and comprising a frame, which is displaceable in the laying direction, for accommodating the pressure plates.

DESCRIPTION OF THE PRIOR ART

Laying heads with a deflection guide for the fiber tapes are usually used for producing fiber structures, which laying heads are pressed against the already laid fiber layers by means of the adjacently arranged pressure plates which form the deflection guide. The fiber tapes, which comprise an adhesive tape carrying a fiber layer, are drawn off from a supply roll to the extent of the forward feed movement of the laying head and supplied to the deflection guide in order to press the fiber layer to the already laid fiber layers on the one hand and to remove the adhesive tape from the fiber layer on the other hand, which requires a comparatively small deflection radius. Since the individual fiber layers of the fiber structure are to be placed tightly on each other with no trapped air in between, a respective pressurization of the fiber tapes by the deflection guide must be ensured. It is known for this purpose (EP 0 371 289 B1) to mount the pressure plates arranged in an assembly next to one another in a displaceable manner independently of each other in the pressing direction in a frame and to apply pressure to the same by a pressure means via a membrane, so that the individual pressure plates are also able to follow an uneven progression of the already laid fiber layers as a result of the flexibility of the membrane. There are limits to the mutually independent pressurization of the individual pressure plates as a result of the local deformation properties of the membrane which are not independent from each other, so that it does not make sense to provide the pressure plates for a finely graduated adjustment to the surface contour of the already laid fiber layers with a thinner configuration than a measure which is predetermined by the deformation properties of the membrane for the mutually independent pressurization of the pressure plates.

In order to reduce the friction between the pressure plates and the fiber tapes, it is further known in apparatuses for laying fiber tapes (U.S. Pat. No. 5,352,306 A) to allow the pressure plates not to act directly on the fiber tapes but via a flexible slider which is fixed to a frame accommodating the pressure plates on the side of the pressure plates which is at the front in the laying direction. Such a slider extending over all pressure plates impairs a finely graduated adjustment of the deflection guide to the surface of the already laid fiber layers.

SUMMARY OF THE INVENTION

The invention is thus based on the object of providing a deflection guide for an apparatus for laying fiber tapes in such a way that the fiber tapes can be pressed by the pressure plates with a respective pressure in a comparatively finely graduated adjustment to the respective surface contour of the already laid fiber layers.

On the basis of an apparatus of the kind mentioned above, this object is achieved in accordance with the invention in such a way that at least a part of the pressure plates respectively form a sliding shoe which is resilient in the pressing direction for the deflection of the tape.

As a result of the arrangement of the pressure plates with sliding shoes which are resilient in the pressing direction, a respective pressing pressure can be exerted via the sliding shoes within the scope of their resilient pretensioning independent of the adjacent sliding shoes on the fiber tapes which are deflected about the sliding shoes, so that the thickness of the pressure plates or sliding shoes can be selected in a sufficiently thin way for the respectively required graduated adjustment to the surface contour of the already laid fiber layers, irrespective of whether the individual pressure plates are pressurized jointly or independently from each other by a pressing pressure. It merely needs to be ensured that the forces exerted on the pressure plates ensure a respective resilient pretensioning of the sliding shoes and thus a pressing of the fiber tapes on the already laid fiber layers in a manner that is substantially constant over the width of the tape.

Especially simple constructional conditions are obtained for the formation of the sliding shoes in such a way that the pressure plates are provided with recesses which separate the sliding shoes from the remaining plate body. The connecting webs produced by the recesses between the plate bodies and the sliding shoes can be used advantageously in this case within the scope of their elastic bending behavior as spring elements.

Since sufficient pretensioning of the sliding shoes must be ensured as a result of the sliding shoes which are resilient with respect to the plate bodies via the pressure means pressurizing the membrane, it is possible to subdivide the sliding shoes of the pressure plates into resilient sliding segments which are parallel to the plane of the plate and which are independent from each other, which allows an especially finely graduated adjustment of the pressure plates to the surface contour of the fiber structure, because the individual sliding segments of the sliding shoes can be displaced in a resilient fashion to the extent of the pretensioning independently from each other in the pressing direction.

The friction between the deflection guide and the fiber tapes should be as low as possible. For this purpose, the sliding surfaces of the pressure plates can be coated accordingly. Especially advantageous constructional conditions are obtained however when the pressure plates are provided with compressed-air channels which open into the sliding surface for the deflection of the tape, so that the compressed air exiting from said compressed-air channels reduces the friction between the sliding surfaces and the adhesive tape of the respective fiber tape without impairing the pressing pressure of the fiber tape on the already laid fiber layers. On the contrary, the pressing of the fibers of the fiber tape on the already laid fiber layers can be supported advantageously by the pressure of the compressed air.

BRIEF DESCRIPTION OF THE DRAWINGS

The subject matter of the invention is shown in the drawings by way of example, wherein:

FIG. 1 shows an apparatus for laying fiber tapes in the region of the deflection guide for the fiber tapes in a schematic longitudinal sectional view;

FIG. 2 shows this apparatus in a sectional view along the line II-II of FIG. 1;

DESCRIPTION OF THE PREFERRED EMBODIMENT

Figure 3:
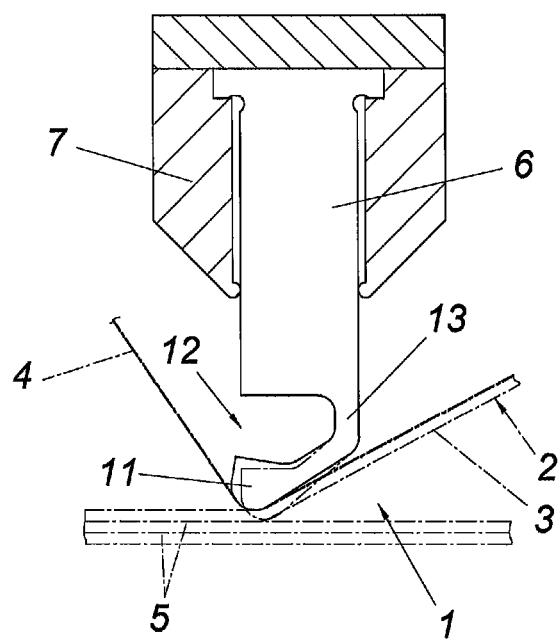
FIG. 3 shows an illustration according to FIG. 1 of a constructional variant of an apparatus in accordance with the invention.

In accordance with the embodiment according to FIGS. 1 and 2, the apparatus for laying fiber tapes comprises a deflection guide 1 for the fiber tapes 2 which comprise an adhesive tape 4 carrying a fiber layer 3. Said fiber tapes 2 are drawn off a supply roll in adjustment to the forward feed of the laying and pressed by means of the deflection guide 1 against the already laid fiber layers 5 of a fiber structure to be formed, wherein the adhesive tape 4 is removed from the fiber layer 3 of the fiber tape 2, which occurs at a comparatively small deflection radius. The deflection guide 1 is composed of a plurality of pressure plates 6 which are arranged next to one of other perpendicularly to the deflection axis and which are displaceably guided in the pressing direction in a frame 7 and are pressurized jointly by a pressing means by means of a membrane 8. In order to achieve simple constructional conditions, the membrane 8 is formed by a pressure hose in the embodiment, which rests on a frame wall 9 as an abutment on the side opposite of the pressure plates 6. The pressure plates 6 are pressed against the already laid fiber layers 5 by pressurization of the membrane 8, wherein the actuating path of the individual pressure plates 6 depends on the surface contour of the already laid fiber layers 5 as a result of the flexibility of the membrane 8.

As is indicated in FIG. 2, a step 10 in the fiber structure cannot be taken into account easily by the membrane deformation because said membrane deformation extends over several pressure plates 6. In order to still enable a finely graduated adjustment of the deflection guide 1 to the surface contour of the fiber structure, despite the limitation caused by the membrane 8, the pressure plates 6 form resilient sliding shoes 11 in the pressing direction, which sliding shoes are separated from the remaining plate body by a recess 12. The remaining connecting webs 13 ensure the resilient properties of the sliding shoes 11 in the pressing direction, so that the sliding shoes 11, as a result of their resilient pretensioning by the pressurization of the plates 6 via the membrane 8, press the fiber tape 2 against the fiber layers 5. This means that the sliding shoes 11 are pressed in a resilient manner against the fiber structure in the region of the fiber structure step 10 in addition to the pressurization of the membrane 8 with the effect that the fiber tape 2 rests with its entire surface on the step 10 of the fiber structure, which would not be ensured by pressurizing the membrane alone. This resilient displacement of the sliding shoes 11 is indicated in FIG. 1 by the dot-dash line.

As a result of the sliding shoes 11 which are resilient in the pressing direction, no separate pressurization of the individual pressure plates 6 is required especially in the case of lower thicknesses. As is shown in FIG. 3, the frame 7 can accommodate the pressure plates 6 in a mutually non-displaceable manner with respect to each other, so that in the case of a loading of the frame 7 with a respective pressing force the sliding shoes 11 of the individual pressure plates 6 are pressurized with a pretension which allows individual pressing of the sliding shoes 11 against the already laid fiber layers 5. In this case, the individual pressure plates 6 can also be integrally connected to each other on the side of the recess 12 which is opposite of the sliding shoes 11.

Figure 4:
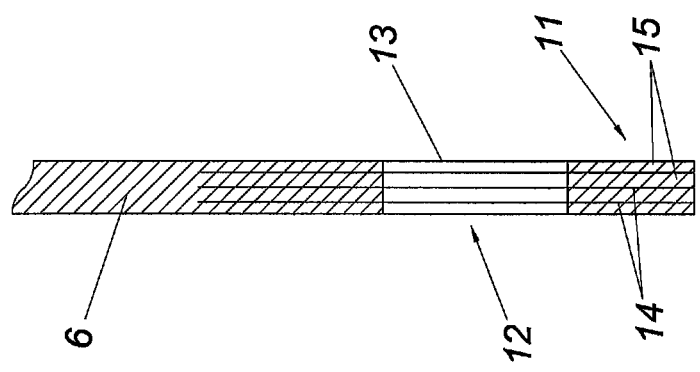
FIG. 4 shows a constructional variant of a pressure plate in the region of the sliding shoe in a sectional view along the line II-II in FIG. 1 on an enlarged scale.

The provision of sliding shoes 11 which are resilient in the pressing direction further allows an additional graduation in the pressurization of the fiber tape 2 over the width of the tape when the sliding shoes 11 are subdivided into sliding segments 15 by slots 14 which are parallel to the plane of the plate, as is indicated in FIG. 4. As a result of their pretensioning via the membrane 8, the sliding segments 15 of the sliding shoes 11 are capable of pressing the fiber tape 2 independently from each other against the surface of the already laid fiber layers 5.

Figure 5:
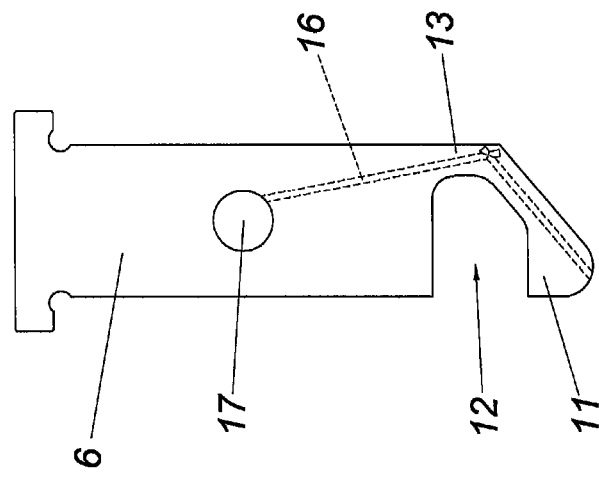
FIG. 5 shows a further embodiment of a pressure plate in accordance with the invention in a simplified side view.

In order to ensure the reduction in the friction between the sliding surface of the sliding shoes 11 and the adhesive tape 4 of the fiber tapes 2, said sliding surfaces can be provided with a sliding coating. Especially effective measures are obtained if the pressure plates 6 are provided according to FIG. 5 with compressed-air channels 16 which open into the sliding surface of the sliding shoes 11, so that the compressed air is injected between the sliding surface of the sliding shoes 11 and the fiber tape 2. For the purpose of the supply with compressed air, the compressed-air channels 16 can originate from a common borehole 17 which extends through the assembly of the pressure plates 6.

What is claimed is:

1. An apparatus for laying fiber tapes, the apparatus comprising
    a deflection guide for the fiber tapes, the deflection guide comprising pressure plates which are arranged adjacent to one another transversely to the deflection axis and
    a frame which is displaceable in the laying direction for accommodating the pressure plates,
    wherein at least a part of the pressure plates respectively forms a sliding shoe, the sliding shoe being resilient in the pressing direction for the deflection of the tape and being resilient with respect to a remaining portion of the respective pressure plate, the part of the respective pressure late forming the deflection guide being resilient opposite the remaining portion.

2. The apparatus according to claim 1, wherein the pressure plates comprise recesses for forming the sliding shoes.

3. The apparatus according to claim 1, wherein the sliding shoes of the pressure plates are subdivided into sliding segments which are parallel to the plane of the plate and are resilient in a mutually independent manner with respect to each other.

4. The apparatus according to claim 1, wherein the pressure plates are provided with compressed-air channels which open into the sliding surface for the deflection of the tape.

* * * * *